US008185693B2

(12) United States Patent
Toub et al.

(10) Patent No.: US 8,185,693 B2
(45) Date of Patent: May 22, 2012

(54) CACHE-LINE AWARE COLLECTION FOR RUNTIME ENVIRONMENTS

(75) Inventors: Stephen H. Toub, Seattle, WA (US); John Duffy, Renton, WA (US); Eric Eilebrecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 12/405,923

(22) Filed: Mar. 17, 2009

(65) Prior Publication Data

US 2010/0241808 A1      Sep. 23, 2010

(51) Int. Cl.
  *G06F 12/06* (2006.01)
(52) U.S. Cl. .............. 711/119; 711/170; 711/E12.017
(58) Field of Classification Search .............. 711/118, 711/170, 171, 172, 119, E12.017
See application file for complete search history.

(56) References Cited

U.S. PATENT DOCUMENTS

| | | | |
|---|---|---|---|
| 5,895,485 | A | 4/1999 | Loechel et al. |
| 6,742,086 | B1 | 5/2004 | Cotugno et al. |
| 6,874,066 | B2 | 3/2005 | Traversat et al. |
| 6,983,456 | B2 | 1/2006 | Poznanovic et al. |
| 7,093,081 | B2 | 8/2006 | DeWitt, Jr. et al. |
| 2003/0028739 | A1* | 2/2003 | Li et al. .................. 711/170 |
| 2005/0060510 | A1* | 3/2005 | Perez .................. 711/170 |
| 2006/0253655 | A1 | 11/2006 | Pudipeddi et al. |
| 2011/0055489 | A1* | 3/2011 | Reddy et al. .................. 711/141 |

OTHER PUBLICATIONS

Kandemir, et al., "Reducing False Sharing and Improving Spatial Locality in a Unified Compilation Framework", retrieved at <<http://ieeexplore.ieee.org/stamp/stamp.jsp?arnumber=01195407>>, IEEE Transactions on Parallel and Distributed Systems, vol. 14, No. 4, Apr. 2003, pp. 337-354.

Akhter, et al., "Understanding and Avoiding Memory Issues with Multi-core Processors", retrieved at <<http://www.ddj.com/embedded/212400410>>, Dec. 11, 2008, pp. 4.

Hung, et al., "Reduction of False Sharing by using Process Affinity in Page-based Distributed Shared Memory Multiprocessor Systems", retrieved at <<http://ieeexplore.ieee.org/stamp/stamp.jsp?arnumber=00562899>>, IEEE, 1996, pp. 383-390.

* cited by examiner

*Primary Examiner* — Pierre-Michel Bataille

(57) ABSTRACT

Target data is allocated into caches of a shared-memory multiprocessor system during a runtime environment. The target data includes a plurality of data items that are allocated onto separate cache lines. Each data item is allocated on a separate cache line regardless of the size of the cache line of the system. The data items become members of a wrapper types when data items are value types. The runtime environment maintains a set of wrapper types of various sizes that are of typical cache line sizes. Garbage data is inserted into the cache line in cases where data items are reference types and data is stored on a managed heap. The allocation also configures garbage collectors in the runtime environment not to slide multiple data items onto the same cache line. Other examples are included where a developer can augment the runtime environment to be aware of cache line sizes.

20 Claims, 2 Drawing Sheets

CACHE-LINE AWARE COLLECTION FOR RUNTIME ENVIRONMENTS

BACKGROUND

Concurrent programming for shared-memory multiprocessors can include the ability for multiple threads to access the same data. The shared-memory model is the most commonly deployed method of multithread communication. Multiple threads execute on multiple processors, multiple processor cores, or other classes of parallelism that are attached to a memory shared between the processors. The processors rarely directly access the shared memory. More common is at least one and often two levels of cache associated with each processor, where the caches access the shared memory and the processors access the respective caches or caches shared between two or more processors.

Data from memory is loaded into caches in cache lines, which is an entry in the cache that represents a selected fixed size amount of data. Thus, data is not read from memory in a single byte or word at a time. Instead, an entire cache line of data is read and cached at once. This takes advantage of the principle of locality of reference, which states that if one location of memory is read, then nearby locations are likely to be read soon afterward. Thus, accessing data from memory at an amount of a cache line at a time eliminates expensive trips to main memory for typical access patterns of sequential code.

When multiple caches are included in a multiprocessing system, a cache coherency protocol is used to ensure integrity of copies of data in separate caches. Unfortunately, such protocols can cause scalability problems in concurrent programming. Multiple threads running on distinct processors with distinct caches may be accessing distinct data, but that data may be close enough in memory to exist on the same cache line. In this case, even though the processors are accessing distinct data and need not use locks in the code to prevent race conditions, the multiprocessing system may need to transfer the cache line back and forth between caches to ensure that the multiple processors do not simultaneously modify the cache line data. The result is significantly worse performance than if the multiple processors were able to work independently on their respective data sets.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The embodiments described below allocate target data into caches of a shared-memory multiprocessor system while executing under a runtime environment. The target data includes a plurality of data items that are allocated onto separate cache lines. Each data item is allocated on a separate cache line regardless of the size of the cache line of the system.

In one embodiment where the data items are value types, the data items become members of a wrapper types. The runtime environment maintains a set of wrapper types of various sizes that are of typical cache line size, such as 64 or 128 Bytes in one example. In one example where the data items are reference types where data is stored on a managed heap, garbage data is inserted into the cache line. The allocation also prevents garbage collectors in the runtime environment, such as garbage collectors that compact the heap, from sliding multiple data items onto the same cache line. Other examples of allocating value type and reference type data items are disclosed.

In embodiments where a developer can augment the runtime environment to be aware of cache line sizes, an attribute can be used to mark objects or types to be allocated at a cache-line boundary. The runtime memory manager and garbage collector both respect the attribute and will only move data items to a cache aligned location. Additional attributes can be used to note that certain data are not to be allocated in the same cache line as other members in the type. Instructions understood in the runtime are used to maintain alignment even if that type is not marked with an attribute.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
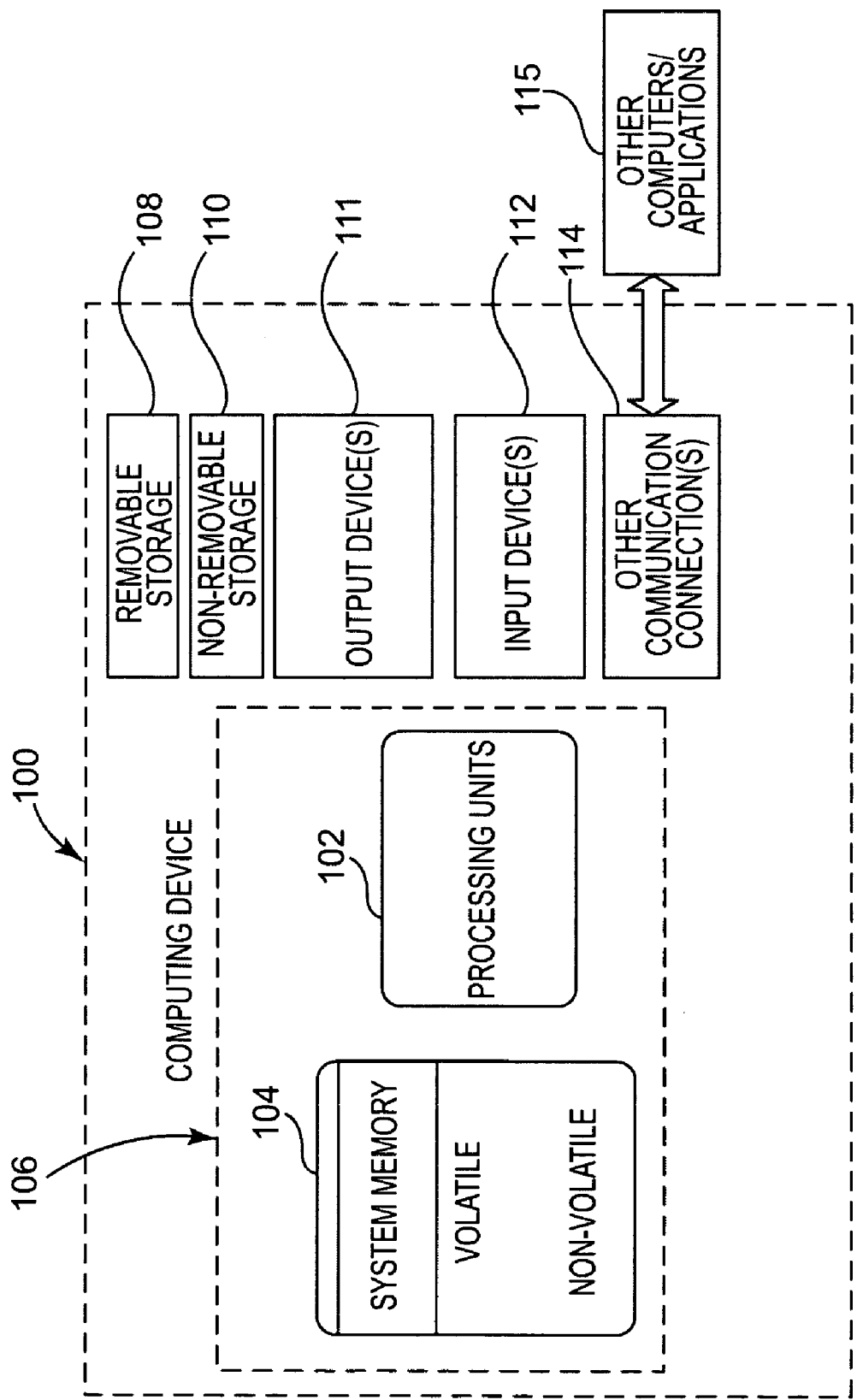
FIG. 1 is a block diagram illustrating one of many possible examples of computing devices implementing the features of the present disclosure.

FIG. 1 illustrates an exemplary computer system that can be employed as an operating environment and includes a computing device, such as computing device 100. In a basic configuration, computing device 100 typically includes a processor architecture having at least two processing units, (i.e., processors 102), and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by line 106. The computing device can take one or more of several forms. Such forms include a personal computer, a server, a handheld device, a consumer electronic device (such as a video game console), or other.

Computing device 100 can also have additional features/functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications/users 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

Computing device 100 can be configured to run an operating system software program and one or more software applications, which make up a system platform. In one example, computing system 100 includes a software component referred to as a runtime environment. The runtime environment can be included as part of the operating system or can be included later as a software download. The runtime environment typically includes pre-coded solutions to common programming problems to aid software developers to create software programs such as applications to run in the runtime environment, and it also typically includes a virtual machine that allows the software applications to run in the runtime environment so that the programmers need not consider the capabilities of the specific processors 102. Two common examples of runtime environments include those sold under the trade designation of .NET from Microsoft Corp. of Redmond, Wash., United States, and Java from Sun Microsystems, Inc. of Santa Clara, Calif., United States.

Memory access is a relatively slow operation in computing systems. For example, memory access is orders of magnitude slower than mathematical calculations in the microprocessor 102. To account for this slow memory access, processors 102 are coupled to memory caches to improve application performance. Caches can be arranged in multiple levels, and computing device 100 can include at least two levels of cache. Often, cache levels are referred to as L1 and L2, and so on. The cache closest to a processor 102, often referred to as level one, or L1 is the fastest, but it is also the most expensive so the computing device 100 will typically have a small amount of L1 cache. Level two cache, or L2 is a bit slower than L1, but is less expensive, and the computing device 100 can include more L2 cache than L1. When data is read from memory 104 for an application, the requested data as well as data around it (referred to as a cache line) is loaded from memory into the caches, and then the application is served from the caches. Loading an entire cache line rather than individual bytes can dramatically improve the performance of an application. Applications frequently read bytes sequentially in memory (common when accessing arrays and the like). Applications can avoid hitting main memory 104 on every request by loading a series of data in a cache line, because of a high likelihood that the data about to be read has already been loaded into the cache.

Figure 2:
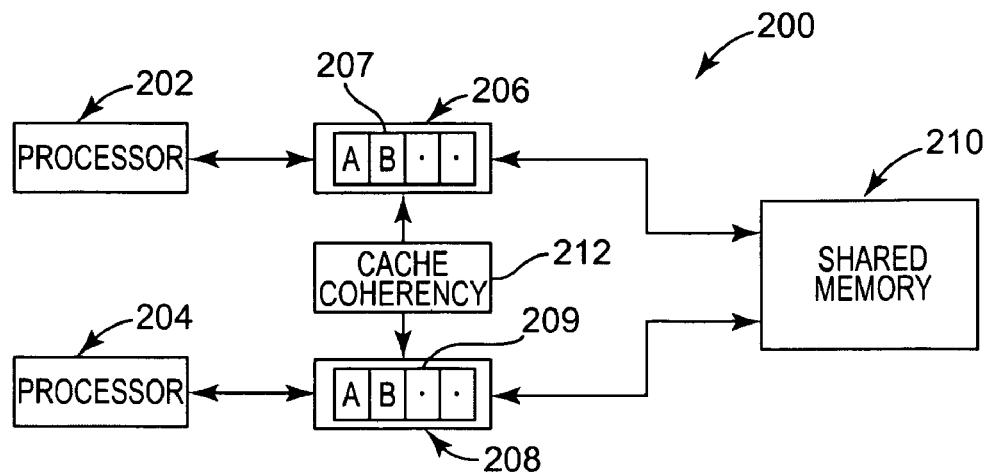
FIG. 2 is a block diagram illustrating a portion of a shared-memory architecture of a computing device of FIG. 1.

FIG. 2 illustrates an example of a shared-memory system 200, which can be included in the computing device 100, of two or more processors 104 or processing systems each coupled to at least one cache of a same memory resource, such as volatile memory 104. In the example shown, two microprocessors 202, 204 are coupled to caches 206, 208, respectively. Each of the caches 206, 208 are coupled to a shared memory 210, which often is some form of volatile memory 104 and can include another cache.

A problem can arise when each cache 206, 208 concurrently accesses the same data item in the target data of each cache line 207, 209 respectively. In the example, both caches 206, 208 include a same cache line including both data item A and data item B. If, for example, cache 206 includes data item A from a read operation, and an application thread running on processor 204 modifies data item A in its cache 208, another application thread running on processor 202 is left with an invalid cache. Accordingly, the caches 206, 208 are controlled with a cache coherency protocol 212 to manage these conflicts. An example cache coherency protocol includes the MESI protocol (Modified, Exclusive, Shared, Invalid), which is in widespread use.

Another problem that can arise when two processors operate on independent data items in the same memory address region storable as a target data in a single cache line. For example, the application thread running on processor 202 may attempt to modify data item A, and the application running on processor 204 can attempt to read data item B. In this case, modifying data item A should not affect data item B, but the hardware architecture can make this appear to the cache coherency protocol as an impermissible type of sharing. This latter example is known as "false sharing," where separate data items are accessed from the same cache line. In contrast, the former example is known as "true sharing" where the same data item is accessed from the same cache line. Typical and widespread cache coherency protocols also respond negatively to false sharing even though false sharing does not involve modifying concurrent data items. The cache coherency mechanisms during false sharing may force the whole line across a bus or interconnect with every data write, forcing memory stalls in addition to wasting system bandwidth.

The problems of false sharing can be readily addressed in native code, such as C++, with cache-aligned allocations. A large enough section of memory can be allocated such that a developer can then compute the right starting point within that allocation in order to place the data, so that the data ends up cache-line aligned and so that the section is large enough to prevent other data from ending up on the same cache line. For example, a developer knows the current system has 64-byte cache lines and needs to store data 40 bytes in size. The developer can allocate a section of memory 128-bytes large. Within the returned range, the developer can find the position that is divisible by 64 (there will be at most two such positions, and at least one), and put the data at that address. Thus multiple data items not part of the same allocation do not exist on the same cache line.

This solution is not applicable to managed code, such as C-sharp (often written as C# in fonts not having the sharp symbol), Java, or the like, however, where the runtime environment controls memory management and where on the managed heap a reference object is allocated (and potentially later moved around by the garbage collector). Without runtime support for cache-alignment, a library based solution to false sharing in a runtime environment is difficult to achieve.

Figure 3:
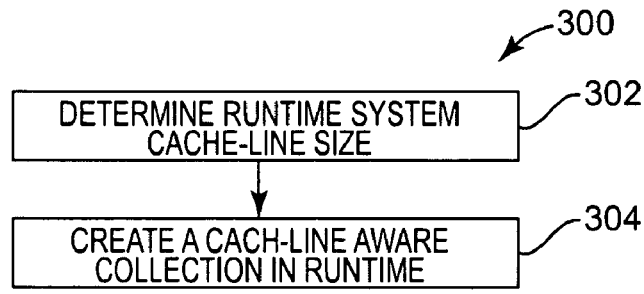
FIG. 3 is a flow diagram illustrating an embodiment of a method for a shared-memory architecture of FIG. 2 or a computing device of FIG. 1.

FIG. 3 illustrates one embodiment of a method 300 for a runtime environment on the shared-memory system 200 to minimize or reduce false sharing. As part of this method 300, the developer or runtime environment can control the types being allocated and permit the cache line size to vary from computing device 100 to computing device. In this method 300, the target data to be cached is arranged in a plurality of data items, such as data items A and B in the example above. The method 300 determines the runtime system cache line size at 302. Thus, the cache line size in the runtime environment is dynamic, and can be made specific to each computing device. A developer is free to program with regard to the runtime environment and not with regard to a specific cache line size or particular device with the runtime environment. The method also provides for creating a cache line aware collection, such as a list, of an array of a plurality of elements at 304. Each of the elements includes one of the data items. Each of the data items is included in a respective element in the collection. The size of the elements is in multiples of the cache line size and in the smallest multiple that will contain the data item. In cases where the data items take up less than a cache line length, the size of the element is one cache line in length.

Figure 4:
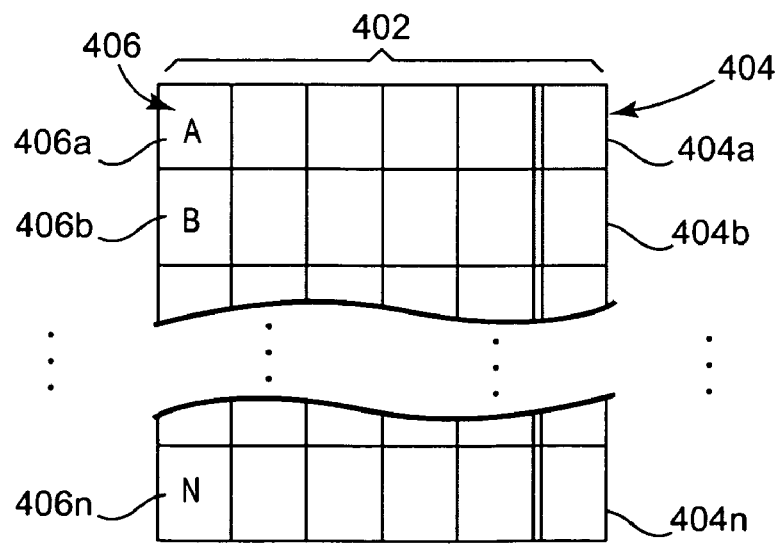
FIG. 4 is a schematic diagram illustrating a collection of elements created with the method of FIG. 3.

FIG. 4 schematically illustrates an example of collection of elements 400 of a cache line length 402 selected in accordance with the length of a cache line in the intended computing device and created with the method of FIG. 3. The collection includes an array of a plurality of elements 404, such as 404a, 404b to 404n. Each of the elements 404a-404n includes a data item 406a, 406b to 406n, respectively. The cache line length 402 can be selected in one or more of a plurality of methods, and the elements can be created in one or more of a plurality of method. In one example, the element is created based on the type of the data item 406a-406n. The example uses cache-aligned allocations, and the data items can be allocated at the beginning of every cache line.

One example of the method 300 includes data items 406 as value types, such as 406a-406n, where the value type can be a struct in C-sharp or primitive type in Java. When data items 406 are value types, one option is to store each data item 406 as a separate element 404 as an individual wrapper type. A wrapper is a data type used to wrap a non-object, such as the value type, to make the non-object appear to be an object. It can also treat the value type as selected length in bytes other than the actual length in bytes of the data type. The wrapper stores the data items as a member, and the wrappers are configured with the runtime environment to be a specific size corresponding to a multiple of the cache line length. The wrappers can be placed on a stack or as part of other types such as an array of wrappers, where the padding added through the wrapper keeps the actual data in the array appropriately spaced.

At runtime, the correct sized wrapper is selected. In one example, the system defines a plurality of wrappers, each corresponding to a typical cache line size. Typical cache line sizes are in powers of two between 64 and 512 bytes inclusive. A system can define, or pre-define, wrappers, such as wrappers of size 64, 96, 128, 192, 256, 312, and 512 bytes to cover most current systems. Other sizes of course are possible, and the system can easily define additional wrappers of 1024, 2048, and so on, or other wrappers not necessarily in powers of two. The system also can dynamically generate at runtime a wrapper of a new size. The appropriate pre-configured wrapper size is selected based on the system cache line length and the smallest cache line multiple that will contain the data item 406 and include enough padding so that the data item will not fall on the same cache line as another data item. For example, if the data item is 32 bytes in length on a system with a 64 byte cache line size, the wrapper is selected to be 128 bytes. In this case, cache lines will be based on memory addresses divisible by 64, so a cache line will start at 0, 64, 128, 192, etc. If a 64 byte wrapper was chosen, for example, instead of the 128 byte wrapper and the system allocated that wrapper at address "60," the 32 bytes of data contained by the wrapper will thus start at 60 and go through address 91. Data from that item will be on both the first cache line (0-63) and the second cache line (64-127). Moreover, there is empty space on that second cache line (92-127) that could be used to store the next item. If that happened, that next item would be sharing a cache line with part of the first item, thus potentially leading to false sharing. Thus, more padding is included and 128 bytes is used instead of 64 bytes. In one example, the managed code can be configured so that the runtime environment or the operating system can call the hardware to determine information about the cache line, including the size of the cache line.

One particular implementation of this example is presented below in the C-sharp pseudo-code of Example 1. In this code, a cache aware list is created including wrappers as elements where structs are the target data items T and members of the wrappers. The wrappers sizes are predefined to be as selected by the runtime or the developer. In the example, wrappers of 64 and 128 byte lengths are defined, and the creation of additional or alternate wrappers is readily apparent from the pseudo code.

Example 1

```
internal interface ValueWrapper<T> { T Value { get; set; } }
internal struct DefaultSizeValueWrapper<T> : ValueWrapper<T> { public T Value { get; set; } }
internal class DefaultSizeValueWrapperList<T> : List<DefaultSizeValueWrapper<T>>, IList<T>
{
    public new this[int index]
    {
        get { return base[index].Value; }
        set { base[index] = new DefaultSizeValueWrapper<T>(value); }
    }
    ...
}
```

-continued

```
[StructLayout(LayoutKind.Sequential, Size = 64)]
internal struct Byte64ValueWrapper<T> : ValueWrapper<T> { public T Value { get; set; } }
internal class Byte64ValueWrapperList<T> : List<Byte64ValueWrapper<T>>, IList<T>
{
   public new this[int index]
   {
      get { return base[index].Value; }
      set { base[index] = new Byte64ValueWrapper <T>(value); }
   }
   ...
}
[StructLayout(LayoutKind.Sequential, Size = 128)]
internal struct Byte128ValueWrapper<T> : ValueWrapper<T> { public T Value { get; set; } }
internal class Byte128ValueWrapperList<T> : List<Byte128ValueWrapper<T>>, IList<T>
{
   ...
}
... // similar code to the above for 256 bytes, 512 bytes, etc.
public class CacheLineAwareList<T>
{
   private IList<T> _list;
   public CacheLineAwareList( )
   {
       _list = CreateMatchingSizeList(GetCacheLineSize( ),GetTypeSize(typeof(T)));
   }
   private static int GetCacheLineSize( ) { ... }
   private static int GetTypeSize(Type t) { ... }
   private static IList<T> CreateMatchingSizeList(int lineSize, int typeSize) { ... }
   public T this[int index] { get { return _list[index]; } set { _list[index] = value; } }
   ...
}
```

Another example using value types includes allocating more data items 406 to the data elements 404 rather than using wrapper types. For instance, if the size of the data item target type T is such that it would take five instances of T to fill a cache line, the array has 6 data items 406 elements per element 404 (the original element plus the 5 necessary to pad out a cache line). And because the data items 406 are contiguous in memory, this generally has the same effect as the wrapper implementation above where one unique data item can exist on a particular cache line. An example pseudo code of an implementation is provided below in Example 2:

Example 2

```
public class CacheLineAwareList<T>
{
    private int _elementsPerEntry;
    private List<T> _list = new List<T>( );
    public CacheLineAwareList( )
    {
       int typeSize = GetTypeSize(typeof(T));
       int lineSize = GetCacheLineSize( );
       _entriesPerElement = (lineSize / typeSize) +1;
       if (lineSize % typeSize != 0) _entriesPerElement++;
    }
    public T this[int index]
    {
       get { return _list[index * _elementsPerEntry]; }
       set { _list[index * _elementsPerEntry] = value; }
    }
    public void Add(T item)
    {
       _list.AddRange(CreateRangeForInsert(item));
    }
    private IEnumerable<Wrapper> CreateRangeForInsert(T item)
    {
```

-continued

```
       yield return item;
       for (int i = 0; i < _entriesPerElement – 1; i++) yield
       return default(T);
    }
    ...
}
```

The pseudo-code of Example 3 below provides one implementation of the method 300 when the data items 406 are reference types, such as classes in C-sharp. Reference types as data items 406 also involve managing a heap where the reference types reside. To address the concerns of the heap, one implementation of a solution includes allocating additional data onto the heap after the data items, which serves to provide a buffer between data items, such that each data item 406 is included in a separate cache line from the other data items.

Example 3

```
public class CacheLineAwareList<T>
{
    [StructLayout(LayoutKind.Sequential)]
    private struct Wrapper
    {
       public T Value;
       private object Garbage;
       public Wrapper(T element) : this(element, true) { }
       public Wrapper(T element, bool addHeapGarbageIfReferenceType)
       {
          Value = element;
          Garbage = !_isValueType && addHeapGarbageIfReferenceType ?
          CreateHeapGarbage( ) : null;
       }
       private static object CreateHeapGarbage( )
       {
```

-continued

```
        int garbageAmountWithoutArrayOverhead =
            _cacheLineSize - ARRAY_OVERHEAD;
        return new byte[garbageAmountWithoutArrayOverhead];
    }
    private static readonly int ARRAY_OVERHEAD = IntPtr.Size * 2;
}
...
}
```

The array stored in the CacheLineAwareList in Example 3 is a List<Wrapper>. Example 4 presents an implementation of a solution for the heap in combination with the solution that is implementation in Example 2 above. The same heap technique could be used with the size-based wrapper. Each entry in the list consumes a certain number of elements, and a wrapper is used per element. A first wrapper contains the reference to the actual entry (data item 406) being stored and it also maintains a reference to garbage data allocated on-demand to consume at least the rest of the cache-line space. In this implementation, the memory manager is allocating data linearly by maintaining a pointer to the next free slot and moving this pointer forward after an allocation. The rest of the wrappers used per entry are empty.

Example 4

```
public class CacheLineAwareList<T>
{
    private int _elementsPerEntry;
    private List<Wrapper<T>> _list = new List<Wrapper<T>>( );
    public CacheLineAwareList( )
    {
        int typeSize = GetTypeSize(typeof(T));
        int lineSize = GetCacheLineSize( );
        _entriesPerElement = (lineSize / typeSize) + 1;
        if (lineSize % typeSize != 0) _entriesPerElement++;
    }
    public T this[int index]
    {
        get { return _list[index * _elementsPerEntry].Value; }
        set { _list[index *_elementsPerEntry] = new Wrapper(value); }
    }
    public void Add(T item)
    {
        _list.AddRange(CreateRangeForInsert(item));
    }
    private IEnumerable<Wrapper> CreateRangeForInsert(T item)
    {
        yield return new Wrapper(item, true);
        for (int i = 0; i < _entriesPerElement - 1; i++) yield
        return Wrapper( );
    }
    ...
}
```

The previous implementations, examples, and solutions are available to developers and others regardless of whether control over the runtime environment is possible. In many cases control over the runtime is not possible or very difficult and the above-described implementations, examples, and solutions are preferred. When control over the runtime is possible, however, the runtime itself can be augmented to be aware of cache-line sizes. An attribute can be used to mark a type to be allocated on a cache-line boundary, and the runtime's memory manager is configured respect that attribute as a cache-line boundary. A garbage collector in the system is configured to also respect this attribute, and will move data to a cache-aligned location even when memory is compacted.

Example 5

```
[CacheAligned]
public class MyType { ... }
```

A garbage collector is often integrated into the system of the runtime environment. The garbage collector is an automatic memory management mechanism that reclaims memory having stored data that will no longer be accessed or otherwise used by the application. The garbage collector is aware of memory allocations, and runs a routine to free memory upon an increase of memory pressure. The effect is to create holes of freed memory in the memory heap, and the remaining data in the heap may be shifted together at one end of the heap in typical memory compaction. The described examples are made aware of this compaction.

Additional attributes can be used within a particular instance to note that certain members are not on the same cache-line as previous members in the type. This will have the effect of adding enough padding between the relevant members of the type (in the example, between _myField1 and _myField2) such that _myField2 is placed at the start of a new cache line. This will place restrictions on where the garbage collector can move this instance to, because when the data is moved, it has to ensure that the relevant fields remains aligned.

Example 6

```
public class MyType
{
    private int _myField1;
    [NewCacheLine]
    private int _myField2;
}
```

Also, instructions understood by the runtime environment can be used to inform the runtime that a particular instance is to be cache-aligned even if the instance type is not attributed with the relevant attribute.

Example 7 var rand=new cachealigned System.Random( );

Although these examples appear to be similar to cache-aligned allocators in circumstances where the developer is unable or chooses not to control the runtime environment, metadata must also be associated with this instance informing the runtime that, throughout the lifetime of this instance, it must always exist on a cache-aligned boundary. This will restrict the garbage collector in where it slides data to while compacting the heap.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, comprising:
allocating target data having a plurality of data items in caches of a shared-memory multiprocessor system while executing under a runtime environment, the allocating including:
determining a system runtime cache line size; and
creating a cache line aware collection including an array of a plurality of elements such that each element has an element size that is an integer multiple of the determined system cache line size, and wherein each of the array of elements includes a unique one of the plurality of data items in the target data, wherein the creating the cache line aware collection includes configuring one of the plurality of data items in a wrapper type if the data item is a value type.

2. The method of claim 1 wherein determining a system runtime cache line size includes a call to the shared-memory multiprocessor system.

3. The method of claim 1 wherein determining a system runtime cache line size includes providing a plurality of cache-line sizes available for use.

4. The method of claim 3 wherein the plurality of available cache line sizes includes sizes of 64 Bytes, 96 Bytes, 128 Bytes, 192 Bytes, 256 Bytes, 312 Bytes, and 512 Bytes.

5. The method of claim 1 wherein determining a system runtime cache line size includes selecting a selecting a cache line size that is dynamically generated.

6. The method of claim 1 wherein the wrapper type is designated to be a cache line length in size.

7. The method of claim 1 wherein each data item is included in a separate wrapper type.

8. The method of claim 7 wherein the array includes a plurality of wrapper types designated to be of one cache length in size, wherein each of the plurality of wrapper types includes a separate data item.

9. The method of claim 1 wherein the value type includes a struct.

10. The method of claim 9 wherein the struct is a member of the wrapper type.

11. The method of claim 1 wherein creating the cache line aware collection includes configuring an array with N+1 elements per data item, wherein the data items each include a data item size and wherein N is determined to be the cache line size divided by the data item size for the corresponding data item.

12. The method of claim 1 wherein creating the cache line aware collection includes configuring a cache line to include one of the plurality of data items and including additional data to reside in the remaining space on the cache line when the data item is a reference type.

13. The method of claim 12 wherein the reference types manage a heap where the reference types reside.

14. The method of claim 13 including allocating the additional data onto the heap after the data items.

15. The method of claim 14 wherein the additional data is garbage data.

16. The method of claim 12 wherein the reference type includes a class.

17. A method, comprising:
allocating target data having a plurality of data items in caches of a shared-memory multiprocessor system while executing under a runtime environment, wherein the caches each are divisible into cache line units;
maintaining a set of wrapper types of a plurality of preselected cache line length sizes for including value type data items, wherein the wrapper type chosen for the allocation is the smallest of the set of wrapper types that will fully contain the data type and where the data items do not reside in the same cache line as other data items;
inserting garbage data after every allocation of a reference type data item, wherein the size of the garbage data is large enough to allocate each reference type data item onto a separate cache line, which allocation is maintained after garbage collection of the runtime environment.

18. A computer-readable storage medium storing computer-executable instructions for controlling a runtime environment on a shared-memory multiprocessor system having a cache memory device, the computer-executable instructions comprising:
allocating target data having a plurality of data items in the cache memory device having cache lines while executing under a runtime environment having managed memory allocation, wherein the runtime environment is aware of cache line sizes, and wherein data items do not reside in the same cache line as other data items; and
marking with an attribute a type to be allocated on a cache line boundary of the cache line, wherein the runtime environment includes a memory manager configured to respect the attribute as the cache line boundary.

19. The computer-readable storage medium of claim 18 wherein the runtime system includes managed code.

20. The computer-readable storage medium of claim 18 wherein padding is included with the data items into the cache lines to separate data items.

* * * * *

UNITED STATES PATENT AND TRADEMARK OFFICE
CERTIFICATE OF CORRECTION

PATENT NO.        : 8,185,693 B2
APPLICATION NO.   : 12/405923
DATED             : May 22, 2012
INVENTOR(S)       : Toub et al.

Page 1 of 1

It is certified that error appears in the above-identified patent and that said Letters Patent is hereby corrected as shown below:

In the Claims

In column 11, line 29, in Claim 5, delete "selecting a selecting a" and insert -- selecting a --, therefor.

Signed and Sealed this
Nineteenth Day of May, 2015

Michelle K. Lee
*Director of the United States Patent and Trademark Office*